United States Patent [19]

Corle et al.

[11] Patent Number: 5,125,750

[45] Date of Patent: Jun. 30, 1992

[54] OPTICAL RECORDING SYSTEM EMPLOYING A SOLID IMMERSION LENS

[75] Inventors: Timothy R. Corle; Gordon S. Kino, both of Santa Clara County; Scott M. Mansfield, San Mateo County, all of Calif.

[73] Assignee: The Board of Trustees of the Leland Stanford Junior University, Stanford, Calif.

[21] Appl. No.: 669,205

[22] Filed: Mar. 14, 1991

[51] Int. Cl.$^5$ .................................................. G02B 7/02
[52] U.S. Cl. ................................... 359/819; 359/664; 359/510; 359/356; 359/646; 369/43
[58] Field of Search ............... 359/661, 664, 819, 823, 359/508, 510, 356, 646; 356/351; 369/43, 44.1, 44.39

[56] References Cited

U.S. PATENT DOCUMENTS

| | | | |
|---|---|---|---|
| 3,556,659 | 2/1966 | Hawes | 359/664 |
| 4,634,234 | 1/1987 | Baumann | 359/661 |
| 5,032,011 | 7/1991 | Muchel | 359/664 |

*Primary Examiner*—Loha Ben
*Attorney, Agent, or Firm*—Flehr, Hohbach, Test, Albritton & Herbert

[57] ABSTRACT

An optical recording system including a read/write optical assembly including an objective lens for reading or writing from an optical medium including a solid immersion lens disposed between the objective lens and having a surface closely spaced from the recording medium.

10 Claims, 3 Drawing Sheets

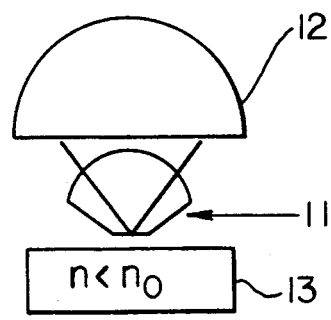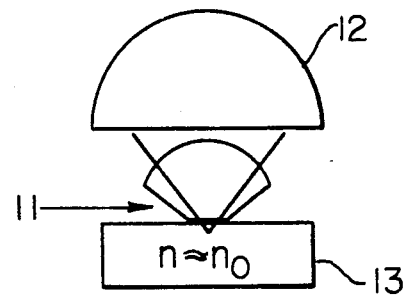
FIG. 1  FIG. 2
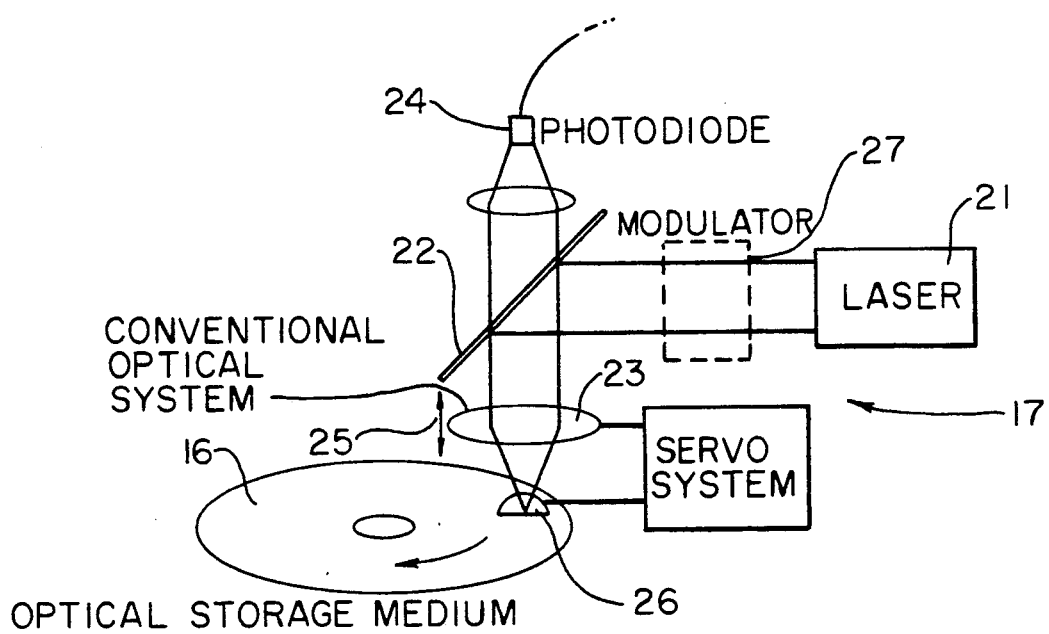
FIG. 3

OPTICAL RECORDING SYSTEM EMPLOYING A SOLID IMMERSION LENS

BRIEF DESCRIPTION OF THE INVENTION

This invention relates generally to an optical recording system and more particularly to an optical recording system employing a solid immersion lens.

BACKGROUND OF THE INVENTION

The best known technique for near-field optical microscopy is to focus through a pinhole that is smaller than the diffraction limited spot size. If the pinhole is placed very close to the object, the pinhole size essentially determines the definition. The fields decay rapidly after passing through the aperture, and for this reason the sample must be brought into close proximity with the pinhole. Near-field optical microscopes based on this principle have been demonstrated by Pohl and others. (See D. W. Pohl, W. Denk and M. Lanz, Appl.-Phys.Lett. 44 652 (1984); E. Betzig, M. Isaacson and A. Lewis, Appl.Phys.Lett. 51, 2088-2090 (1987)). In copending application Ser. No. 07/508,224 filed Apr. 12, 1990 assigned to a common assignee, there is described an optical microscope which includes a high refractive index solid immersion lens interposed between the objective lens and the sample being viewed to provide a microscope having improved resolution. By placing the solid immersion lens (SIL) in contact with or very close to the sample, it can be used for imaging in two modes: the near field mode and the internal imaging mode. These two modes are illustrated in FIGS. 1 and 2 which show a solid immersion lens 11 interposed between an objective lens 12 and a sample 13.

In its near-field mode of operation, illustrated in FIG. 1, the microscope uses both the evanescent fields just outside the flat surface of the SIL and fields that propagate in air to focus objects placed close to the SIL. The propagating fields allow the system to be easily focused and the evanescent fields improve the resolution in air by a factor 1/n, where n is the index of refraction of the solid immersion lens material. Thus, near-field operation of this kind makes it possible to partially circumvent diffraction effects which limit the transverse resolution of scanning confocal and standard optical microscopes to approximately a half wavelength in air.

In the internal imaging mode, an SIL is used which has the same refractive index as the medium being examined, and the SIL is placed in contact with or very close to the sample (FIG. 2). In this case, the beam may be focused into the interior of the sample without aberration, and a definition which depends on the wavelength inside the sample rather than that in air.

In optical recording, a light beam is used as a multipurpose tool for both marking and reading information from a recording media. In optical recording, an optical stylus provides a tightly focused spot of light to the recording media. The light is used to read or form marks on the surface of the recording medium. Generally, the light is focused by an objective lens spaced from the media. Optical read/write head designs are described in the book entitled, "Optical Recording" authored by Alan B. Marchant, Addison-Wesley Publishing, 1990.

The base technologies of head design, coding, error correction, media design and media manufacturing are continuously being improved to provide higher density storage of information.

Among other factors, the recording density is dependent on the spot size of the focused light. It is desirable to decrease the spot size to improve the resolution of the optical storage media and hence, the amount of information stored per $cm^2$.

OBJECTS AND SUMMARY OF THE INVENTION

It is a general object of this invention to provide an improved read/write head for optical storage and compact discs.

It is a further object of the invention to provide a read/write head in which a solid immersion lens (SIL) is interposed between the objective lens and the recording media to decrease spot size and increase the optical recording density and resolution.

The foregoing and other objects of the invention are achieved by an optical read/write head of the type which includes an objective lens and a solid immersion lens interposed between the optical recording media and the objective lens.

BRIEF DESCRIPTION OF THE DRAWINGS

The foregoing and other objects of the invention will be more clearly understood from the following description when read in conjunction with the accompanying drawings, in which:

FIG. 1 illustrates the principles of an SIL operating in the near-field mode.

FIG. 2 illustrates the principles of an SIL operating in the internal imaging mode.

FIG. 3 is a schematic diagram of an optical recording system employing an SIL in accordance with this invention.

DETAILED DESCRIPTION OF THE INVENTION

Figure 4:
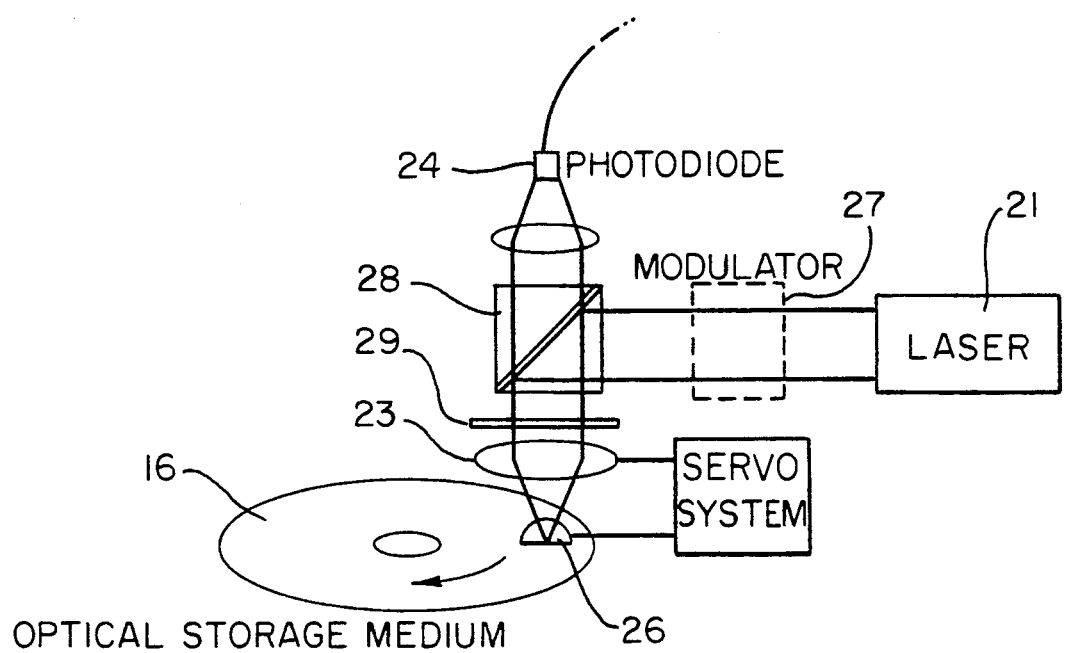
FIG. 4 is a schematic diagram of an optical recording system employing polarization components to enhance recovery of stored signals.

Referring to FIG. 3, there is schematically shown an optical recording system. The system employs an optical recording disc 16 which is associated with a read/write head assembly 17. Read and write assemblies are described in the book, "Optical Recording" referenced above. The system includes a recording disc 16 onto which is focused light from the laser 21. The light is deflected by beam splitter 22 and focused as a spot onto the recording medium 16 by an objective lens 23. The reflected light is received by photodiode 24.

In accordance with the present invention, SIL 26 is placed below conventional read/write optical assembly 17 to reduce the wavelength of light at the surface of the optical disc by a factor of $\lambda/n_{SIL}$. The reduced wavelength allows smaller spots of light to be produced at the surface of the disc (optical recording medium). The SIL includes a spherical surface facing the lens system and a flat surface spaced from the recording medium.

Figure 5A:
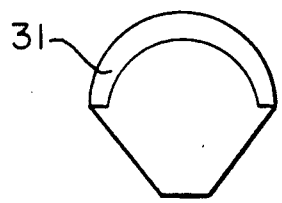
FIGS. 5A and 5B show solid immersion lenses including integral quarter wave plates.
Figure 5B:
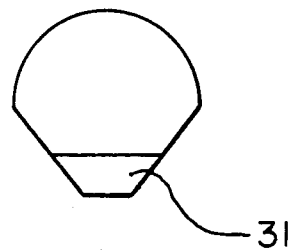

With reference to FIG. 3, light from a laser or other source is used to illuminate the optical disc through the objective lens/SIL combination. In high power mode, the intensity of the laser may either be directly or externally modulated by modulator 27 to write bits of data on the disc. When the laser is "on" it burns a small hole in the disc or otherwise changes its physical properties in order to store a bit of information. In low power mode, the reflected signal may be read by a photodiode 24 to decode the information stored on the disc. Alternatively, the optical disc may contain a magnetic storage medium in which the magnetization is controlled by the incident light to store information and the stored information is read out by sensing the rotation of polarization of reflected light introduced by the magnetized medium. Often polarization components are used in the optical system to aid in retrieving the stored signal. These polarization components often take the form of an optical isolator. An optical isolator is used to prevent the light reflected from the sample from returning to the laser and thus interfering with its operation. A simple optical isolator can be constructed from a polarizing beamsplitter and a quarter wave plate. A quarter wave plate is a piece of optically active material which is placed in an optical system so that the difference in phase between two orthogonal polarizations propagating through the material is ¼ wavelength. Common materials for constructing quarter wave plates are quartz and mica. An optical isolator can be added to the system shown in FIG. 3 by replacing the beamsplitter 22 shown with a polarizing beamsplitter 28 and adding a quarter wave plate 29 between the polarizing beamsplitter and the objective lens 23, FIG. 4. Another method is to construct the SIL out of optically active material which is oriented so that the SIL itself functions as the quarter wave plate. Such a system would reduce the number of components in the optical system, and also would allow reflections from the top surface of the SIL to be eliminated from the image. Alternatively, a quarter wave plate 31 could be bonded or coated to the top or bottom surface of the SIL as shown in FIGS. 4, 5A and 5B. The SIL is a passive device which reduces the spot size at the surface of the optical disc, thus allowing more information to be stored.

The size of the spot of light determines the size of a stored bit of information on the optical disc. If an SIL with $n_{SIL}=2$ is used, the spot size of one bit of information is cut in half so that the density of bits is increased by a factor of 4. Thus, the simple addition of an SIL into an optical system can dramatically increase the storage capacity of an optical disc system.

A second advantage of having a smaller spot size is that the optical power density at the surface of the optically sensitive material is higher than in a system without an SIL. A higher power density allows lower power illumination sources to achieve the necessary power densities to activate (or expose) a bit on the disc.

Figure 6:
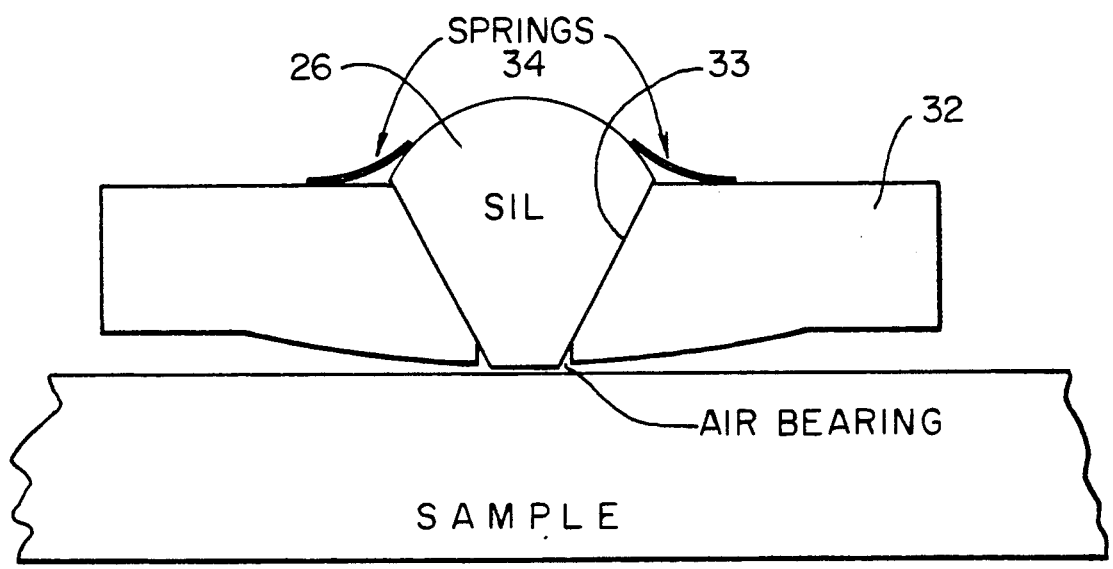
FIG. 6 shows a floating mount for an SIL.

The position of the objective lens 23 and SIL 26 are maintained by a servosystem. Preferably, the SIL is maintained at a height of approximately 50 nm above the optical disc in order to realize the improved definition. One simple method is to "fly" the SIL above the surface of the optical disc similar to the way in which thin film magnetic heads are flown above the surface of magnetic discs. In a properly designed system, the air currents generated by the spinning disc cause the head to float 50 nm above the disc surface, thus automatically maintaining the spacing. A suitable floating mount is shown in FIG. 6. It is mounted in a mounting member 32, which includes a conical opening 33 which receives the SIL 26. The springs 34 hold the conical shaped SIL while allowing it to float.

Many optical storage devices have a protective covering over the optically active material. In order to focus through this material with improved definition, the SIL may be made of material with the same index of refraction as the protective coating, FIG. 2. Such a configuration will produce aberration-free imaging beneath the protective coating and may also allow three-dimensional optical storage inside the disc by moving the focus up or down to layers more than the depth of focus $1.8\lambda/N.A.^2$ apart, where N.A. is the numerical aperture. The focal point may be moved up or down a distance of $\Delta z$ by moving the microscope objective lens 23 up or down, as indicated by arrow 25, a distance of $n\Delta z$.

What is claimed is:

1. An optical system including a read/write head assembly for reading or writing information on an adjacent recording medium of the type which includes an objective lens for focusing light energy onto a recording medium, including a solid immersion lens disposed between the read/write head assembly and the recording medium, said solid immersion lens including a spherical surface facing said read/write head assembly and a flat surface closely spaced from said recording medium.

2. An optical system as in claim 1 in which said objective lens is moved up or down to focus optical energy at selected depths inside said recording medium.

3. An optical system as in claim 1 in which said solid immersion lens is mounted so that it can float on an air bearing caused by relative movement of the solid immersion lens and recording medium.

4. In an optical system including a read/write head assembly for reading or writing information on an adjacent recording medium of the type which includes a laser for providing light energy, an optical system including an objective lens for focusing light energy received from the laser, a solid immersion lens mounted between the objective lens and the recording medium, said solid immersion lens including a spherical surface facing said objective lens and a flat surface closely spaced from said recording medium, a phototransducer for receiving light energy reflected from said surface and polarization components for preventing light reflected from said recording medium to return to and interfere with the laser.

5. An optical system as in claim 4 in which said objective lens is moved up or down to focus optical energy at selected depths within said recording medium.

6. An optical system as in claim 4 in which said solid immersion lens is mounted so that it can float on an air bearing caused by relative movement between the recording medium and the optical recording medium.

7. An optical system including an objective lens for focusing light energy to or receiving light from a sample, a solid immersion lens mounted between the objective lens and said sample, said solid immersion lens including a spherical surface facing said objective lens and a flat surface closely spaced to the sample, and polarization components which act together as an optical isolator, said solid immersion lens including an optically active material in order to function as the quarter wave retarder in said optical isolator.

8. An optical system as in claim 7 used in conjunction with a read/write head assembly for reading or writing information on an adjacent recording medium.

9. An optical system as in claim 7 in which said solid immersion lens is an optically active material.

10. An optical system as in claim 7 in which said solid immersion lens includes a layer of optically active material.

* * * * *